United States Patent
Adolph et al.

(10) Patent No.: US 8,813,334 B2
(45) Date of Patent: Aug. 26, 2014

(54) DOUBLE CLUTCH

(75) Inventors: Marcus Adolph, Remseck (DE); Klaus Dussel, Karlsruhe (DE); Bernhard Wolf, Baden-Baden (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 157 days.

(21) Appl. No.: 13/057,688

(22) PCT Filed: Jul. 27, 2009

(86) PCT No.: PCT/DE2009/001055
§ 371 (c)(1),
(2), (4) Date: Feb. 4, 2011

(87) PCT Pub. No.: WO2010/015228
PCT Pub. Date: Feb. 11, 2010

(65) Prior Publication Data
US 2011/0155529 A1    Jun. 30, 2011

(30) Foreign Application Priority Data
Aug. 7, 2008  (DE) .......................... 10 2008 036 740

(51) Int. Cl.
*F16D 13/75*    (2006.01)
(52) U.S. Cl.
USPC ................. 29/407.02; 192/110 R; 29/407.05; 29/407.09; 29/407.1
(58) Field of Classification Search
CPC ............................. F16D 13/75; F16D 13/755
USPC ......................................................... 192/84.5
See application file for complete search history.

(56) References Cited

U.S. PATENT DOCUMENTS

| | | | | |
|---|---|---|---|---|
| 3,559,772 A * | 2/1971 | Grombka | ....................... | 188/170 |
| 4,601,377 A * | 7/1986 | Flotow et al. | ............. | 192/110 R |
| 4,625,396 A * | 12/1986 | Ahmed et al. | .................. | 29/701 |
| 4,667,799 A | 5/1987 | Kummer | | |
| 4,821,395 A * | 4/1989 | Cook | ......................... | 29/407.05 |
| 5,699,890 A * | 12/1997 | Swenson, Sr. | ............ | 192/110 R |
| 7,438,170 B2 * | 10/2008 | Maier et al. | ..................... | 192/98 |
| 2004/0060779 A1 * | 4/2004 | Kreger | ......................... | 188/71.5 |
| 2007/0193843 A1 | 8/2007 | Uhler et al. | | |
| 2007/0199787 A1 | 8/2007 | Graf et al. | | |

FOREIGN PATENT DOCUMENTS

DE    10 2006 017 711 A1    10/2007
EP         1 933 032 A    6/2008

* cited by examiner

Primary Examiner — Gene Crawford
Assistant Examiner — Mark Manley
(74) Attorney, Agent, or Firm — Lucas & Mercanti, LLP

(57) ABSTRACT

A torque transmitting device in a drive train of a vehicle, which has an assembly on the engine side and an assembly on the transmission side. A geometrically defined installation position of the torque transmitting device between the assemblies can be set by inserting a compensating element, such as an adjustment disk. A thickness of the compensating element depends on the air gap of the torque transmitting device to be set.

5 Claims, 5 Drawing Sheets

DOUBLE CLUTCH

This application is a 371 of PCT/DE2009/001055 filed Jul. 27, 2009, which in turn claims the priority of DE 10 2008 036 740.0 filed Aug. 7, 2008, the priority of both applications is hereby claimed and both applications are incorporated by reference herein.

The present invention relates to a torque transmitting device according to the preamble of claim 1, and to a method of mounting such a torque transmitting device in a drive train of a motor vehicle.

Examples of such torque transmitting devices are, for example, clutches, such as frictional clutches, multiple-disk clutches, turning set clutches or safety clutches, torque converters with converter bridging clutches as well as brake units.

In the manufacture of such torque transmitting devices, for example, in dry dual clutches, insufficient torque transmitting capacities were observed even in the new condition.

Therefore, it is an object of the present invention to provide a torque transmitting device which is inexpensive to manufacture and has a sufficient torque capacity.

This object is met in accordance with the invention by a torque transmitting device having the features of claim 1.

Preferred embodiments of the torque transmitting device according to the invention are recited in the dependent claims.

It is a further object of the present invention to provide a method for mounting such a torque transmitting device in a drive train of a motor vehicle.

With respect to method technology, the object is met according to the invention by a method having the features of claim 6.

Preferred embodiments of this method according to the invention are recited in the dependent claims.

The present invention is in the following explained in more detail with the aid of preferred embodiments in connection with the corresponding figures. In the drawing.

Figure 1:
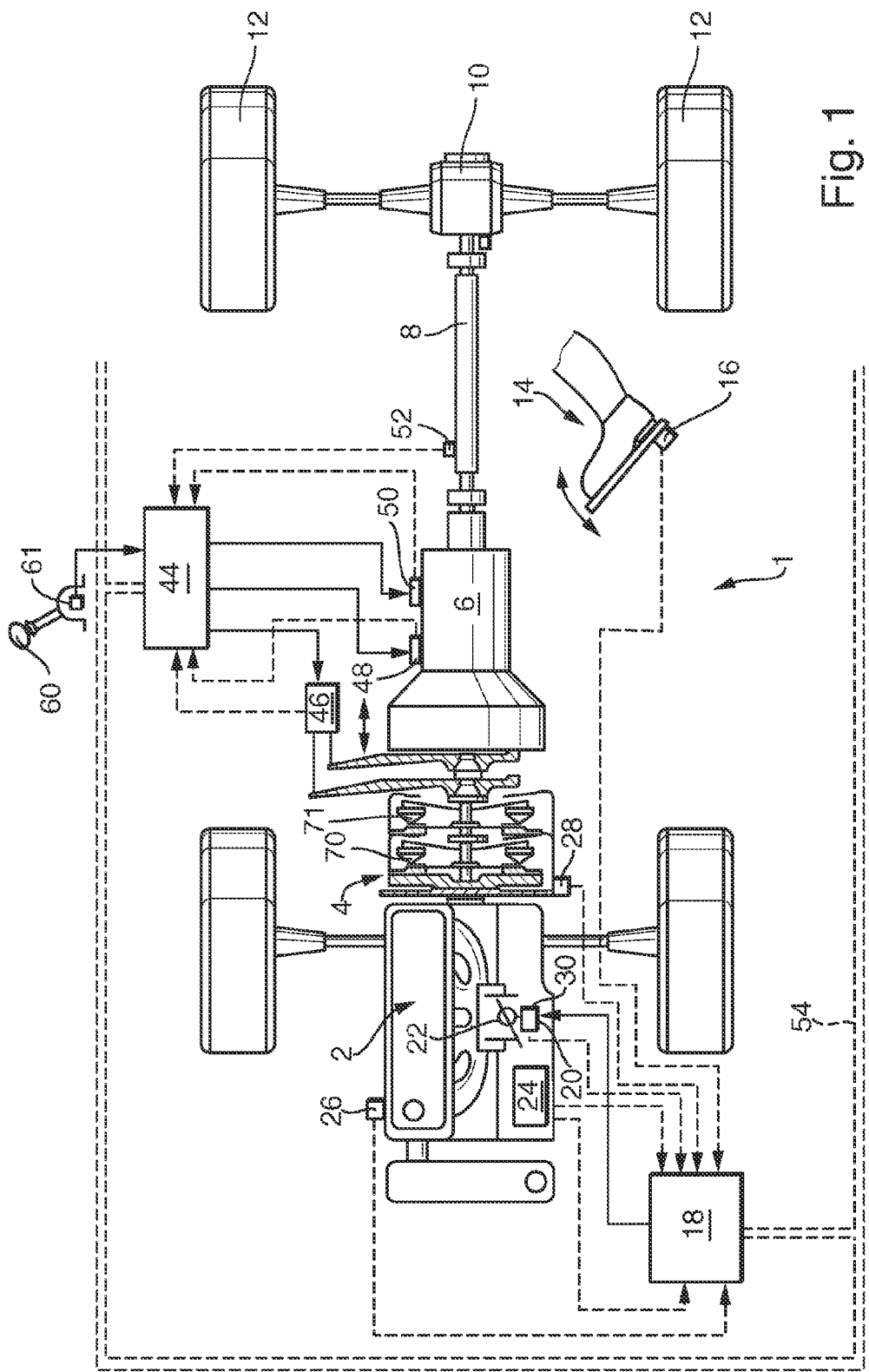
FIG. 1 is a schematic illustration of the construction of a drive train of a motor vehicle with a dry double clutch as an example of a possible torque transmitting device.

FIG. 1. schematically shows a drive train 1 of a motor vehicle which comprises a drive motor 2 constructed as an internal combustion engine, a dual clutch unit 4 and a gear unit 6. At least the rear wheels 12 of the motor vehicle are driven via a cardan shaft 8 and a differential gear unit 10. In the same manner it may of course be a vehicle having one or more driven axels.

In that case, the dual clutch 4 is arranged between the drive motor 2 and the gear unit 6 in such a way that a first input shaft of the gear unit is connected to a first clutch disk and a second input shaft of the gear unit is connected to a second clutch disk, wherein the state of disengagement of these clutch disks is changeable independently from each other by means of the actuating levers.

The clutches 70, 71 can be actuated automatically by means of an actuating system 46, wherein the clutches 70,71 can be actuated independently from each other. The actuating system 46 comprises two actuating levers, which act independently of each other on appropriate disengaging or engaging bearings, depending upon whether the respective clutch is in the basic state open or closed. The disengagement bearings or engagement bearings act in the present case independently of each other on a plate spring or a stack of plate springs.

Figure 2:
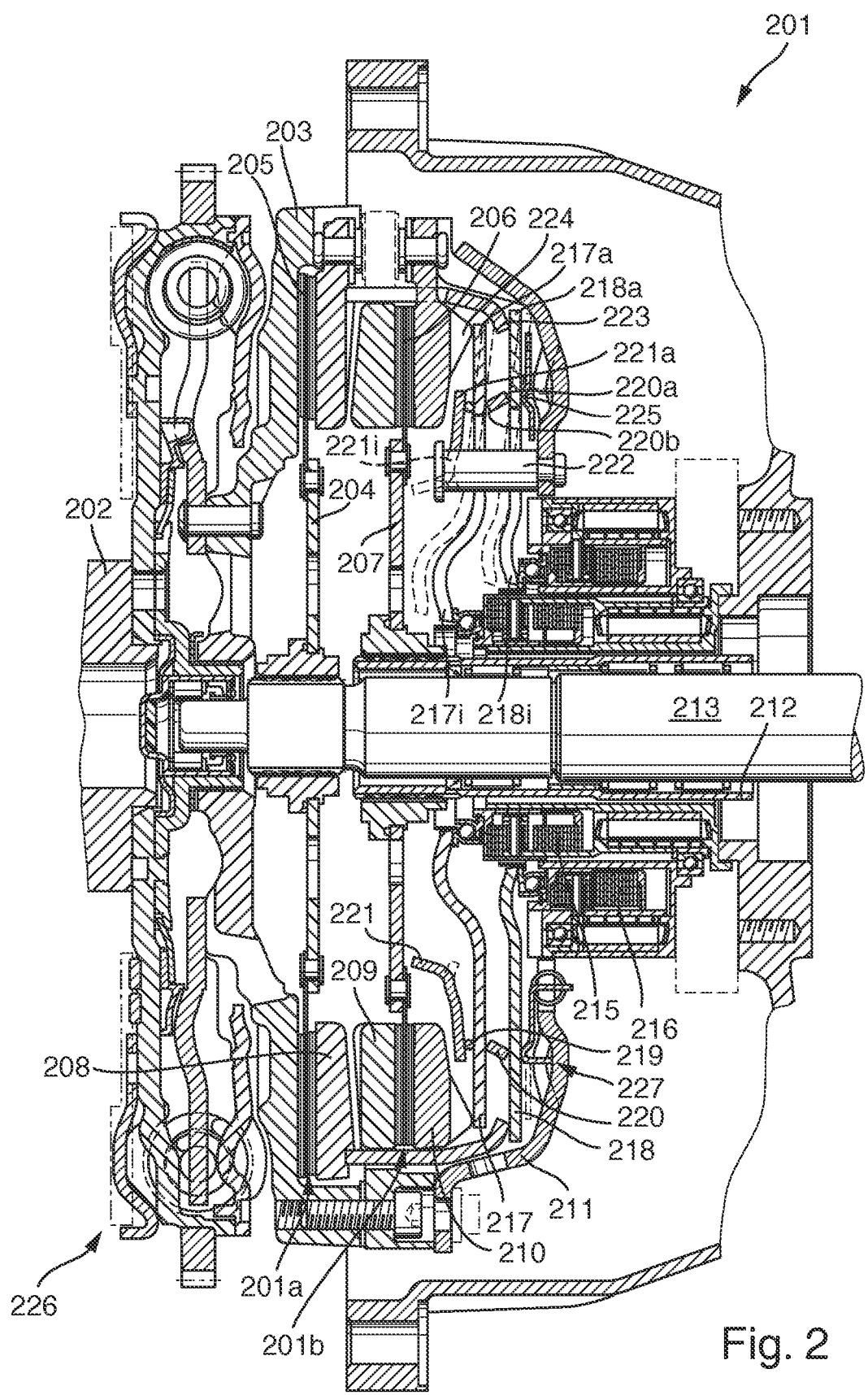
FIG. 2 is a schematic illustration of the construction of a double clutch as an example of a torque transmitting device.

In the illustrated invention (as will be described in more detail below), both clutches of the dual clutch gear unit are open in the basic state. Alternatively, one of the clutches or both clutches can also be closed in the basic state (as illustrated in FIG. 2 and explained in the following). In the same sense, they define one or two disengagement bearings when one or more of the clutches of the dual clutch gear unit are closed in the normal state.

FIG. 2 shows a further embodiment of a dual clutch 201 with wear readjustment and central hydraulically actuated disengagement element, wherein the disengagement element comprises two frictional clutches 201a and 201b, wherein the clutches are closed in the basic state, as described in more detail below.

The frictional clutch 201a has in the illustrated embodiment according to FIG. 2 a clutch disk 204 which is connected to a gear unit input shaft 213 and can be drive-connected to the driven shaft 202 of a motor, particularly of an internal combustion engine. The frictional clutch 201b has a clutch disk 207 which is connected to gear unit input shaft 212 and can be drive-connected the driven shaft 202 of a motor, as in particular an internal combustion engine. The clutch disk 204 is with its frictional linings 205 arranged axially between a pressure plate 203 and a contact pressure plate 208, the clutch disk 207 is with its frictional linings 206 arranged axially between a pressure plate 209 and a contact pressure plate 210. The pressure plates 203 and 209 are connected axially fixed and rotationally fixed to the driven shaft 202. The contact pressure plates 208 and 210 are connected non-rotationally, but axially moveable over a certain area, to the clutch cover 211, which is also connected to the driven shaft 202 of the motor. The connection of the pressure plates 203, 209 with the driven shaft 202 of the motor takes place in the present embodiment, for example, by way of a structural part 226 which forms an inertia mass and which may comprise, for example, two inertia masses connected to each other resiliently and with damping. For connecting the driven shaft 202 of the motor with the gear unit input shaft 213 of a gear unit, not illustrated in detail, the clutch disk 204 is axially tensionable with its frictional linings 205 by way of an axial displacement of the contact pressure plate 208 between the pressure plate 203 and the contact pressure plate 208, wherein with increasing tensioning an increasing friction and, thus, an increasing drive occurs between the plates 203 208 and the frictional linings 205 of the clutch disk 204. The clutch disk 207 is tensionable with its frictional linings 206 by way of an axial displacement of the contact pressure plate 210 between the pressure plate 209 and the contact pressure plate 210 in order to create a connection between the driven shaft of the motor and the gear unit input shaft 212, wherein with increasing tensioning an increasing friction and, thus, an increasing drive occurs between plates 209, 210 and the frictional linings 205 of the clutch disk 204.

The actuation of the clutch 201a by way of an axial displacement of the contact pressure plate 208 takes place by means of a drive 216 which is formed by an actuating element which in the present case is formed by a plate spring 218 and effects an axial movement of the contact pressure plate 208. The drive 216 acts on radially inwardly located areas 218i of the plate spring 218 via a disengagement bearing. The plate spring 218 is supported by a portion 220a of an annular spacer element 220 which simultaneously acts as a pivot point around which the plate spring 218 is pivotable when actuated. The actuation of the contact pressure plate 208, and thus of the clutch 201a, takes place over radially outside areas 218a by means of an intermediate element 223. The plate spring 218 is supported in the area axially opposite of the area 220a of the annular spacer element 220 by supports 225 of a readjustment device 227. The plate spring 218 acts on the contact pressure plate 208 in the basic state in the sense of an engagement; by an actuation by means of the drive 216, an axial movement of the contact pressure plate 208 against the force of the plate spring is possible and, thus, a disengagement of the clutch 201a is effected.

The actuation of the clutch 201b takes place by means of the drive 215. The movement of the drive 215 is transmitted via an actuating device constructed as a plate spring 217 to the axially moveable contact pressure plate 210. In this connection, the plate spring 217 rests on an annular intermediate element 219. The counter support on the axially opposite side of the plate spring 217 is formed by area 220b of the annular spacer element 220. The drive 215 acts on radially inner portions 217i of the plate spring 217. The annular intermediate element 219 forms a pivot point around which the plate spring 217 is pivotable when actuated. Radially outward areas 217a of the plate spring 217 rest on support areas 224 of the contact pressure plate 210. The plate spring 217 acts on the contact pressure plate 210 in the basic state of the clutch in the sense of an engagement; by an actuation by means of the drive 215, an axial movement of the contact pressure plate 210 is possible against the force of the plate spring and thus, a disengagement of the clutch 201b is effected.

In the arrangements illustrated in FIGS. 1 and 2, the respective pressure plates are in their relative zero-position, i.e., in their installation positions defined by the construction. For example, if the disengagement bearing shown in FIG. 2 and assigned to the plate spring 218 is moved by the drive 216 toward the left as seen in the drawing, the clutch 201a is disengaged. If the disengagement bearing assigned to the plate spring 217 is moved by the drive 215 toward the right as seen in the drawing, the clutch 201b is disengaged.

Within the scope of the present invention, that actuating distance which is traveled in a clutch closed in the basic state up to the beginning of a torque reduction at this disengagement process covered by the actuating device, is called a "negative" air gap of the clutch. In this connection, the actuating device may be, for example, a disengaging bearing, a plate spring of a frictional clutch or the pressure plate itself.

Alternatively, it is also possible that one or both clutches are constructed so as to be open in the basic state, as it is the case in the embodiment according to FIG. 1. In that case, the pressure plates are pre-loaded by the corresponding plate springs into the open state and via engagement bearings the plate springs are loaded against this pre-loading into the engaged state.

Within the scope of the present invention, that path of actuation which has to be traveled up to the beginning of a torque build-up in the engagement process by the actuating device, is called the "positive" air gap of the clutch. In this connection, the actuating device may be, for example, a disengaging bearing, a plate spring of a frictional clutch or the pressure plate itself.

Accordingly, the definition of a air gap applies correspondingly both in engagement bearings as well as in disengagement bearings. In the following, for reasons of simplicity, the term air gap is only generally referred to and the invention is discussed with respect to clutches that are open in the basic state, exclusively as an example and non-limiting.

However, with increasing air gap of a clutch which is open in the basic state, the torque transmitting capacity of the clutch becomes lower because only a smaller portion of the actually present maximum actuating distance is available. This correlation can be seen also in FIG. 3.

Figure 3:
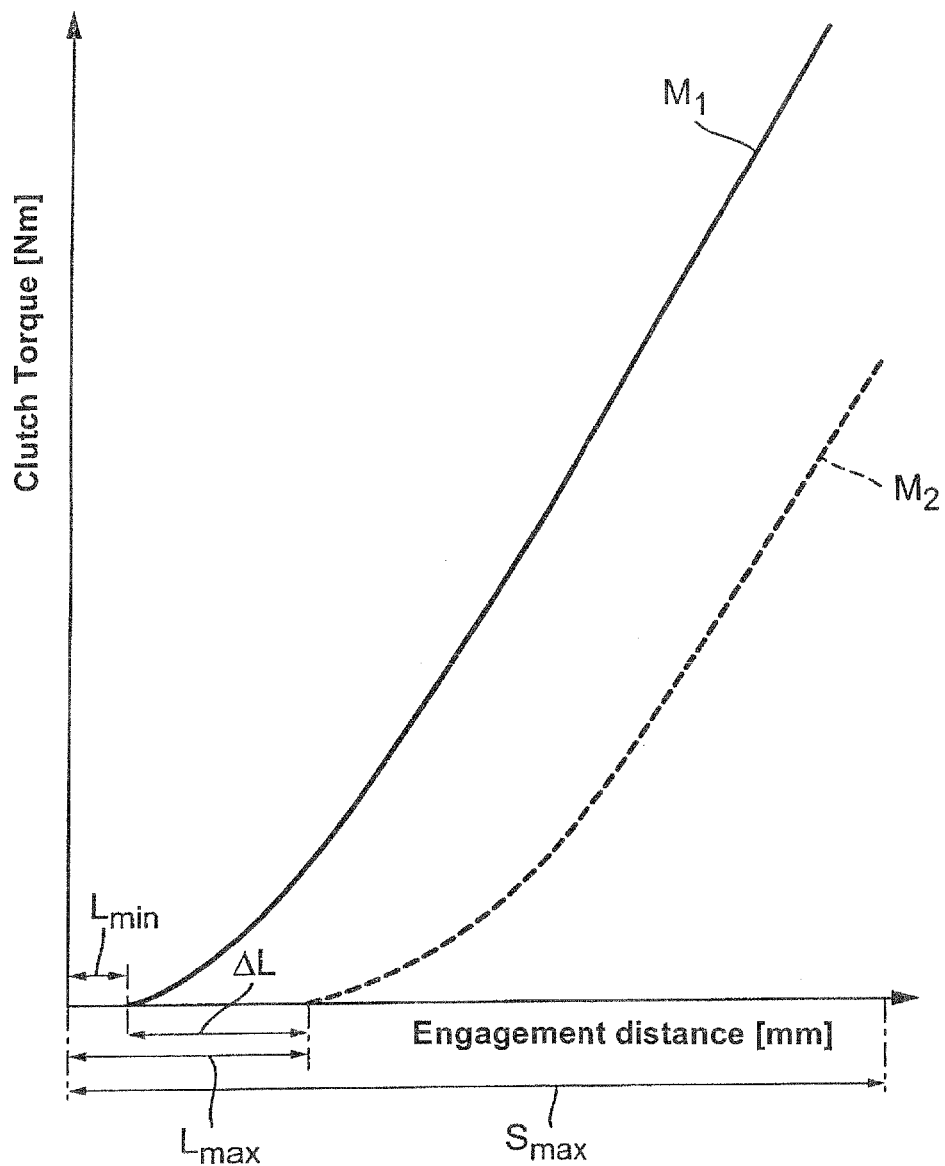
FIG. 3 shows schematically the torque built-up generally of a clutch over the engagement distance thereof.

In FIG. 3, the clutch torque is illustrated over the engagement distance of the clutch as a curve M1 for a minimum air gap Lmin and as curve M2 for a maximum air gap Lmax. The minimum air gap is determined in the construction and describes the minimum distance of the engagement system up to which no clutch torque is yet to be built up. The maximum air gap is also determined in the construction and describes the maximum distance of the engagement system from when on a torque transmission is to begin in all cases. The closer an actual air gap approaches the maximum air gap, the shorter the remaining actuating distance Smax becomes. Consequently, the total actuating distance available is no longer utilized in an optimum manner. While a clutch in new condition is accepted with an actual actuating distance in the interval between Lmin and Lmax, because for economic reasons, a further narrowing of the air gap tolerances (via construction component tolerances) is not desirable. However, it is possible that the situation occurs in which in the new condition of the clutch an insufficient torque transmission capacity occurs.

Therefore, it is desirable to specify a torque transmitting device and a method for mounting such a torque transmitting device in a drive train of a motor vehicle in which air gap tolerances of the torque transmitting device can be compensated in a gear unit of a vehicle.

FIGS. 1 and 2 further show that a structural group of the dual clutch is connected to the gear unit (housing) and another structural group of the dual clutch is connected to the engine side (particularly with the crank shaft). The clutch must appropriately compensate for the tolerances between motor and gear unit, as well as for the tolerances of the structural parts of the clutch itself.

For an adjustment of a defined point of operation or defined mounting position of the clutch, by measuring gear unit and actuating system tolerances, appropriate adjustment disks for compensating the tolerances can be selected. These adjusting disks could then be placed between the actuating system and the clutch tongues of the plate spring. Consequently, independently of the clutch itself, a geometrically defined mounting position would be determined and adjusted by way of the adjusting disks.

In generalizing this solution, by means of such an insertion of a compensating means of a certain width (thickness), tolerances of gear unit and tolerances of the actuating system of the clutch can be compensated, wherein a mounting position of the clutch defined during the construction phase (=nominal or rated mounting position) is compared to an actual state of the mounting position in the first assembly (normally at the manufacturer of the clutches) and a tolerance error determined in this manner is compensated by means of a compensating means of appropriate width.

The reason for this problem is the fact, as already explained, that the clutch in the new condition does not have a sufficient torque capacity. However, the torque capacity is, among others, dependent on the air gap of the clutch. The (positive) air gap is a measure for (i.e. influences) the actuating path which must be covered until the torque build-up begins. With increasing air gap, the torque transmission capacity of the clutch drops because only a smaller portion is available of the existing actuating distance. Consequently, the available actuating distance is not used in an optimum manner. However, for economic reasons, a further narrowing of the air gap tolerances is not possible. In accordance with the present invention it is therefore provided that when determining the thickness of the adjusting disk, not only the tolerances of gear unit and clutch actuating system are considered, but also to base the consideration on the air gap of the clutch. By considering the air gap of the individual (partial) clutches, it is therefore possible to also compensate the clutch tolerances.

Accordingly, in accordance with the air gap of the clutch, the nominally selected adjusting disk (i.e., the adjusting disk thickness determined in dependence of the tolerances of gear unit and clutch actuating system) is now varied in its thickness in such a way that the air gap is influenced in a targeted manner. Consequently, it is possible to adjust air gaps of the clutch which are too large or too small to a desired air gap in the gear unit. Thus, an actuating distance reserve is insured for all tolerance positions of the clutch, so that the torque transmission safety in the gear unit increases. Thus, this targeted shimming is a process which is individual for each clutch.

Accordingly, the present invention provides a method which is capable of compensating the air gap tolerances of the clutch in the gear unit.

Figure 4:
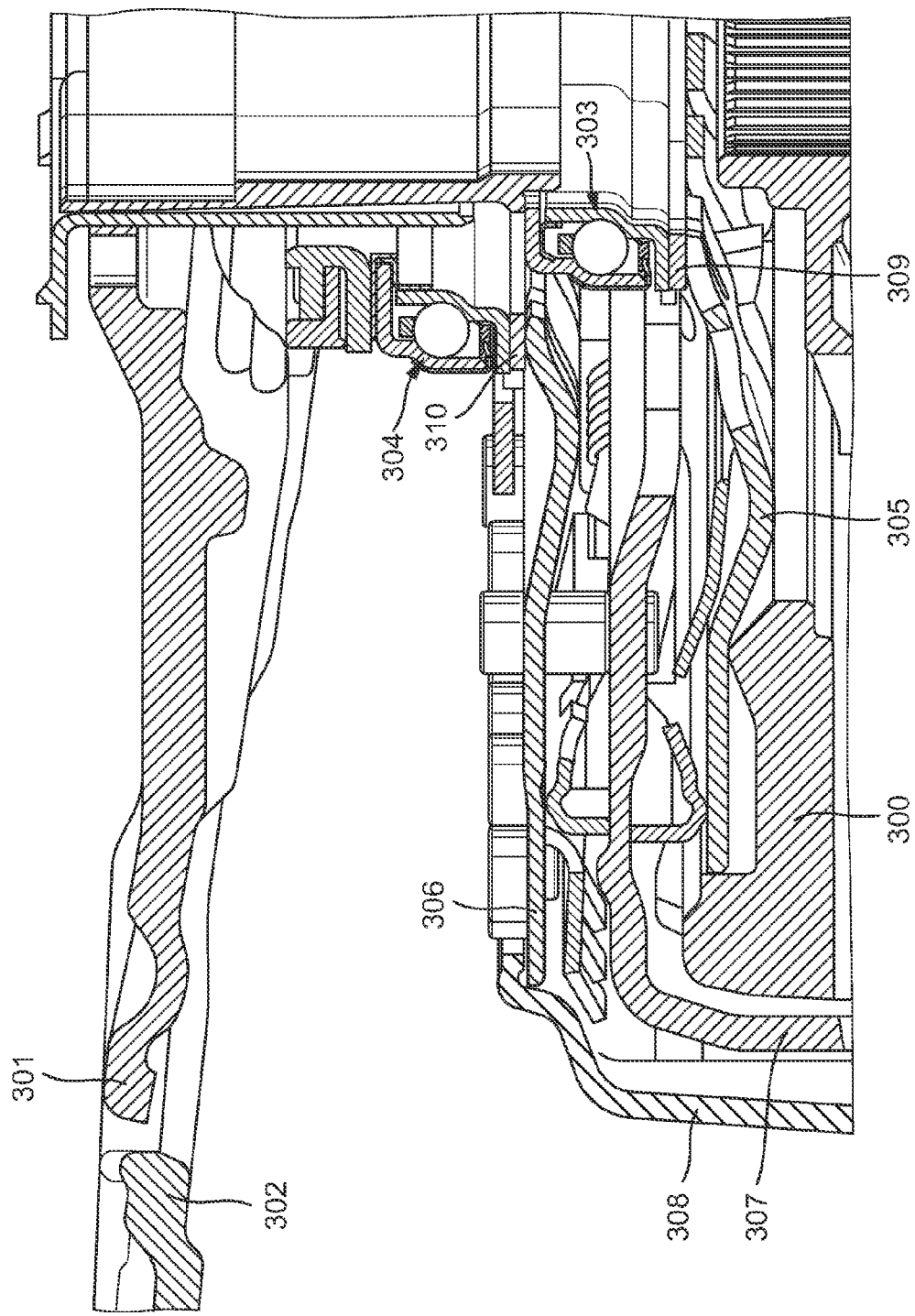
FIG. 4 is a schematic illustration of another embodiment of a dry double clutch as a sectional view together with an engagement system with an adjusting element (adjustment disk), and FIG. 5. is a principal illustration of the adjusting procedure with a magnitude step-down of the possible compensating element thicknesses.

As an example for this adjusting process, FIG. 4 shows a double clutch with two frictional clutches which are open in the basic state. Of these frictional clutches, however, only the pressure plate 300 arranged on the side of the gear unit is shown because this section is sufficient for showing the possible (alternative or cumulative) arrangement variations of the compensating element (the adjusting disks).

In this connection, FIG. 4. Shows, apart from two actuating levers 301, 302, engagement bearings 303, 304 and plate springs 305, 306 as component parts of the engaging system. In addition, FIG. 4 shows a part 307 connected to a housing, on which the plate springs are supported and a tie rod 308 for the second pressure plate, not illustrated.

FIG. 4 in particular shows two adjusting disks 309, 310 of a certain thickness as examples of possible compensating elements.

The adjusting disk 309 is arranged between the engagement bearing 303 and the plate spring 305. The additional adjusting disk 310 is arranged between the additional engagement bearing 304 and the additional plate spring 306.

Consequently, the air gap of each of the clutches of the double clutch is adjustable independently of the respective other clutch by way of separate adjusting disks 309, 310 or by way of the thickness thereof.

As an alternative, the adjusting disks 309, 310 could also be arranged between the engagement bearings 303, 304 and sliding sleeves (not shown), wherein these sliding sleeves are arranged between the actuating levers 301, 302 and the engagement bearings 303, 304. In addition, the adjusting disks can also be arranged cumulatively relative to the engagement bearing "in front of" and "behind" the bearings. The adjusting disk thickness of the individual adjusting disks can be equal or different.

In the conventional selection of a thickness of the adjusting disks already described above, the tolerances of the gear unit and the actuating system are also considered, so that a defined mounting position of the clutch is facilitated. However, beyond this conventional selection, for compensating the clutch tolerances the parameter air gap is additionally taken into consideration when selecting the thickness of the adjusting disks. As a result, among all tolerance positions, it is not a defined mounting position of the clutches which is adjusted, but a defined air gap of the clutch in the gear unit by way of a targeted misalignment of a mounting position of the clutch. This makes the thickness of the adjusting disks not only dependent on the gear unit and actuating system tolerances, but also on the air gap of the clutch itself.

In other words, in accordance with the determined air gap of the clutch, the nominally selected adjusting disk is varied with respect to its thickness in such a way that the air gap is influenced in a targeted manner. Thus, there is the possibility of adjusting air gaps of the clutch which are too large or too small to a desired air gap in the gear unit. Thus, the torque capacity in the new condition, which is dependent on the air gap of the clutch, is also adjusted. As a result, an actuating distance reserve for all tolerance positions of the clutch is ensured, so that the torque transmission safety in the gear unit is increased. The procedure according to the invention (which can also be called a targeted shimming) is a process which is individual to each clutch.

Figure 5:
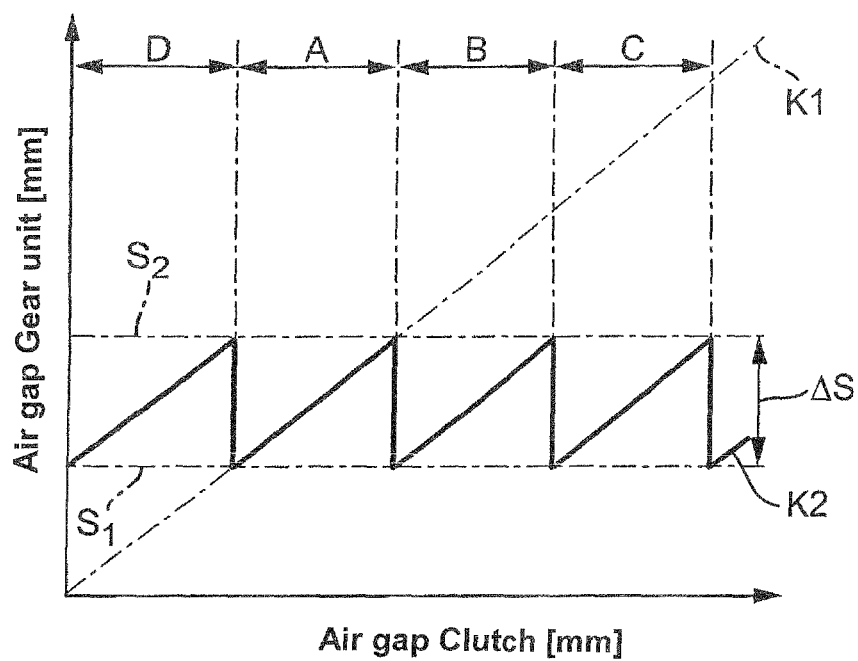

Starting from the illustration according to FIG. 4, the further illustration according to FIG. 5 illustrates the air gap in the gear unit in dependence of the air gap of the clutch. The air gap in the gear unit is equal to the change of the thickness of the adjusting disk (i.e. the "misalignment" of the nominal mounting position) in relation to the clutch transmission ratio.

It must be taken into consideration in this connection that according to a preferred embodiment, the adjusting disks are present in magnitude stages, and that the desired target air gap in the gear unit is dependent on the thickness stages between the adjusting disks. Consequently, this results in a target air gap range each.

In this connection, the area A in FIG. 5 shows an adjusting disk in which no misalignment of the nominal mounting position, i.e., change of the thickness of the adjusting disk, has been carried out. Area D shows an adjusting disk in which a misalignment of the nominal mounting position has been carried out by selecting a stage thinner than the nominal mounting position. Area B shows an adjusting disk in which a misalignment of the nominal mounting position has been carried out by selecting a stage thicker than the nominal mounting position. Area C shows an adjusting disk in which a misalignment of the nominal mounting position has been carried out by selecting two stages thicker than the nominal mounting position.

The selection of the height of the individual stages is basically free, wherein, for reasons of economic considerations, the stage should not be selected too fine. In addition, for reasons of strength, the stages should not drop below a lower minimum thickness.

The curve K1 indicates the air gap when selecting an adjusting disk without misalignment, i.e. without change of the thickness of the adjusting disk determined by the gear unit tolerances and actuating system tolerances. The curve K2 indicates the air gap when selecting the adjusting disks with the thickness adjustments, corresponding to areas A through D.

The air gaps of the clutch would then be classified accordingly. Each of these classes have assigned to it a targeted change of the nominal adjusting disk thickness. The information (classes) required for a targeted adjustment, is individually marked on the respective double clutch, for example, in the form of a bar code, or are delivered together with the clutch. This information is read out during the assembly of the component (for example in the gear unit assembly) and is further processed, so that the appropriate correction of the adjusting measure can be carried out.

The present process makes it possible to admit greater tolerances for air gaps in the manufacture because these can be compensated in a targeted manner by individually measuring the clutch tolerances and reporting them on the clutch in such a way that intermediate pieces (adjustment disks) can be selected in a targeted manner on the basis of information stated on the clutch.

Above, the present adjusting process is described using the example of a double clutch. However, the present adjusting procedure is not limited thereto. Rather, the adjusting process according to the present invention can also be transferred to simple clutches, either dry or wet, and also to brake systems. In the same manner, it can be transferred to wear readjustment mechanisms or actuating systems which automatically compensate the mounting position tolerances. Also in this case, an appropriate misalignment of each thickness can be provided.

The invention claimed is:

1. A method for mounting a torque transmission device in a drive train of a vehicle having an engine side structural group on an engine side and a gear unit side structural group on a gear unit side, comprising the following steps:
    assembling the torque transmission device;
    determining an actual air gap in an assembled state of the torque transmission device, wherein the actual air gap is a function of construction component tolerances;
    determining a desired thickness of a compensating element in dependence on the determined actual air gap in comparison to a desired air gap, the compensating element being a separate exchangeable element disposable at one of the engine side structural croup and the gear side structural group;
    recording an information about a thickness of the compensating element determined in this manner, the information being separate from the compensating element, the step of recording comprising one of marking the information as plain text or coded description on the torque transmission device, and delivering the information together with the clutch; and
    wherein the torque transmission device is supplied separately without the compensating element during a manufacture of the vehicle, and that during the manufacture of the vehicle, when mounting the torque transmission device in a drive train of a vehicle, the method comprises reading out the recorded information and selecting a compensating element having the thickness corresponding to the read recorded information provided on the respective torque transmission device during the assembly of the torque transmission device.

2. The method according to claim 1, wherein an air gap of the torque transmission device is classified into classes, and wherein a nominal compensating element thickness is assigned to each of the classes.

3. The method according to claim 2, wherein the information indicates the nominal compensating element thickness.

4. The method according to claim 3, wherein the information for the nominal compensating element thickness is read out during the assembly of the of the torque transmission device and is further processed, so that an appropriate correction of the actual air gap can be carried out.

5. The method according to claim 1, wherein the compensating element is an adjusting disk.

* * * * *